I
US008265300B2

(12) United States Patent  (10) Patent No.: US 8,265,300 B2
Reid et al.  (45) Date of Patent: *Sep. 11, 2012

(54) METHOD AND APPARATUS FOR CONTROLLING VOLUME

(75) Inventors: Glenn Reid, Woodside, CA (US); James Brasure, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1059 days.

This patent is subject to a terminal disclaimer.

(21) Appl. No.: 11/949,764

(22) Filed: Dec. 3, 2007

(65) Prior Publication Data

US 2008/0080721 A1  Apr. 3, 2008

Related U.S. Application Data

(63) Continuation of application No. 10/337,925, filed on Jan. 6, 2003, now Pat. No. 7,319,764.

(51) Int. Cl.
*H03G 3/00* (2006.01)
*H03G 9/00* (2006.01)
*G06T 11/20* (2006.01)
*G09B 15/00* (2006.01)
*G06F 3/00* (2006.01)

(52) U.S. Cl. ........ 381/104; 381/102; 381/107; 345/440; 345/440.1; 84/477 R; 715/700; 715/711

(58) Field of Classification Search .......... 381/102–109; 84/477 R; 345/440, 440.1; 715/700, 711, 715/788, 798
See application file for complete search history.

(56) References Cited

U.S. PATENT DOCUMENTS

| 4,868,687 | A | | 9/1989 | Penn et al. |
| 5,151,998 | A | | 9/1992 | Capps |
| 5,204,969 | A | * | 4/1993 | Capps et al. .................. 704/278 |
| 5,331,111 | A | | 7/1994 | O'Connell |
| 5,359,712 | A | | 10/1994 | Cohen et al. |
| 5,659,793 | A | | 8/1997 | Escobar et al. |
| 5,682,326 | A | | 10/1997 | Klingler et al. |
| 5,692,117 | A | | 11/1997 | Berend et al. |
| 5,835,611 | A | | 11/1998 | Kaiser et al. |
| 5,874,950 | A | | 2/1999 | Broussard et al. |
| 5,880,722 | A | | 3/1999 | Brewer et al. |
| 5,892,506 | A | | 4/1999 | Hermanson |
| 5,929,867 | A | | 7/1999 | Herbstman et al. |
| 5,940,573 | A | | 8/1999 | Beckwith |
| 5,999,173 | A | | 12/1999 | Ubillos |
| 6,023,016 | A | | 2/2000 | Tamura |
| 6,154,600 | A | * | 11/2000 | Newman et al. .............. 386/281 |
| 6,154,601 | A | | 11/2000 | Yaegashi et al. |

(Continued)

OTHER PUBLICATIONS

Notice of Allowance of U.S. Appl. No. 10/337,925, Aug. 21, 2007 (mailing date), Reid, et al.

(Continued)

*Primary Examiner* — Devona Faulk
(74) *Attorney, Agent, or Firm* — Adeli & Tollen LLP

(57) ABSTRACT

Some embodiments of the invention provide a method for controlling the volume of an audio track. This method represents the volume of an audio track with a graph. This graph is defined along two axes, with one axis representing time and the other representing the volume level. A user can adjust the graph at different instances in time in order to change the volume level in the audio track at these instances. Different embodiments use different types of graphs to represent volume. For instance, some embodiments use a deformable line bar.

26 Claims, 9 Drawing Sheets

U.S. PATENT DOCUMENTS

| | | |
|---|---|---|
| 6,222,540 B1 | 4/2001 | Sacerdoti |
| 6,239,846 B1 | 5/2001 | Billing |
| 6,266,103 B1 | 7/2001 | Barton et al. |
| 6,392,135 B1 | 5/2002 | Kitayama |
| 6,469,711 B2 | 10/2002 | Foreman et al. |
| 6,512,522 B1 | 1/2003 | Miller et al. |
| 6,678,661 B1 | 1/2004 | Smith et al. |
| 6,694,087 B1 | 2/2004 | Weaver |
| 6,704,029 B1 | 3/2004 | Ikeda et al. |
| 6,744,968 B1 | 6/2004 | Imai et al. |
| 6,828,971 B2 | 12/2004 | Uesaki et al. |
| 6,867,787 B1 | 3/2005 | Shimizu et al. |
| 6,928,613 B1 | 8/2005 | Ishii et al. |
| 6,952,655 B2 | 10/2005 | Cake et al. |
| 6,956,574 B1 | 10/2005 | Cailloux et al. |
| 7,030,872 B2 | 4/2006 | Tazaki |
| 7,062,713 B2 | 6/2006 | Schriever et al. |
| 7,134,093 B2 | 11/2006 | Etgen et al. |
| 7,194,676 B2 | 3/2007 | Fayan et al. |
| 7,225,405 B1 | 5/2007 | Barrus et al. |
| 7,319,764 B1 | 1/2008 | Reid et al. |
| 7,355,606 B2 | 4/2008 | Paquette |
| 7,411,590 B1 | 8/2008 | Boyd et al. |
| 7,610,553 B1 | 10/2009 | Jacklin et al. |
| 7,653,550 B2 | 1/2010 | Schulz |
| 7,688,683 B2 | 3/2010 | Griner et al. |
| 7,725,828 B1 | 5/2010 | Johnson |
| 7,805,685 B2 | 9/2010 | Cannistraro et al. |
| 2001/0020953 A1 | 9/2001 | Moriwake et al. |
| 2002/0044148 A1 | 4/2002 | Ludi |
| 2002/0154140 A1 | 10/2002 | Tazaki |
| 2002/0154156 A1 | 10/2002 | Moriwake et al. |
| 2002/0156805 A1 | 10/2002 | Schriever et al. |
| 2002/0163498 A1 | 11/2002 | Chang et al. |
| 2003/0002851 A1 | 1/2003 | Hsiao et al. |
| 2003/0117431 A1 | 6/2003 | Moriwake et al. |
| 2003/0164845 A1 | 9/2003 | Fayan et al. |
| 2004/0088723 A1 | 5/2004 | Ma et al. |
| 2004/0199395 A1 | 10/2004 | Schulz |
| 2005/0231512 A1 | 10/2005 | Niles et al. |
| 2007/0159487 A1 | 7/2007 | Felt |
| 2010/0275121 A1 | 10/2010 | Johnson |
| 2010/0281366 A1 | 11/2010 | Langmacher et al. |
| 2010/0281367 A1 | 11/2010 | Langmacher et al. |
| 2010/0281380 A1 | 11/2010 | Langmacher et al. |
| 2010/0281404 A1 | 11/2010 | Langmacher et al. |

OTHER PUBLICATIONS

Non-Final Office Action of U.S. Appl. No. 10/337,925, Jan. 10, 2007 (mailing date), Reid, et al.
Non-Final Office Action of U.S. Appl. No. 10/337,925, Jun. 6, 2006 (mailing date), Reid, et al.
Non-Final Office Action of U.S. Appl. No. 10/337,925, Dec. 5, 2005 (mailing date), Reid, et al.
Final Office Action of U.S. Appl. No. 10/337,925, May 20, 2005 (mailing date), Reid, et al.
Non-Final Office Action of U.S. Appl. No. 10/337,925, Aug. 26, 2004 (mailing date), Reid, et al.
Author Unknown, "Adobe Premiere Pro CS3—Classroom in a Book," The Official Training Workbook From Adobe Systems, Nov. 3, 2007, Chapter 9, pp. 202-221, Adobe Systems Incorporated, San Jose, California, USA.
Author Unknown, "Add or Remove Series Lines, Drop Lines, High-low lines, or Up-down Bars in a Chart," MS Office Support web site for Microsoft Office Excel, Month Unknown, 2007, Microsoft Corporation, Washington, USA.
Author Unknown, "Adobe Premiere Pro CS3: User Guide," Month Unknown, 2007, Adobe Systems Incorporated, San Jose, California, USA.
Author Unknown, "Adobe Director 11: User Guide," Month Unknown, 2008, Adobe Systems Incorporated, San Jose, California, USA.
Author Unknown, "Using Adobe Flash CS4 Professional," Month Unknown, 2008, Adobe Systems Incorporated, San Jose, California, USA.
Author Unknown, "Using Adobe Premiere Elements 8 Editor," Month Unknown, 2009, Adobe Systems Incorporated, San Jose, California, USA.
Updated portions of prosecution history of U.S. Appl. No. 10/337,925, Sep. 27, 2007, Reid, Glenn, et al.
Portions of prosecution history of U.S. Appl. No. 12/433,886, Dec. 18, 2009, Langmacher, Tom, et al.
Portions of prosecution history of U.S. Appl. No. 12/475,601, Aug. 12, 2010, Langmacher, Tom, et al.
Portions of prosecution history of U.S. Appl. No. 12/475,602, Dec. 18, 2009, Langmacher, Tom, et al.
Portions of prosecution history of U.S. Appl. No. 12/475,598, Aug. 12, 2010, Langmacher, Tom, et al.
Jones, Jerry, "India Pro Special Effects Titler," The Ken Stone Index, Apr. 1, 2002, pp. 1-18.
Meade, Tom, et al., "Maya 6: The Complete Reference," Month N/A, 2004, pp. iv-xviii, 194, 204, McGraw-Hill Companies, California, USA.
Spencer, Mark, "Working with Keyframes in Motion, Part 1: Creating and Manipulating Keyframes," The Ken Stone Index, Feb. 11, 2005.
Stone, Ken, "Using the Text Generators in FCP" The Ken Stone Index, Aug. 27, 2001, pp. 1-13.
Stone, Ken, "The Basics—Editing with Transitions in Final Cut Pro," The Ken Stone Index, Jun. 12, 2001, pp. 1-5.
Brenneis, Lisa, "Final Cut Pro 3 for Macinotsh: Visual QuickPro Guide," Apr. 2002, 288 pages, Peachpit Press, Berkeley, CA, USA.
Stone, Ken, "Basic Keyframing in Final Cut Express," The Ken Stone Index, Jan. 27, 2003, pp. 1-14, V. 1.0.1, Ken Stone.
Stone, Ken, "Motion Paths and the Bezier Handle in FCP," The Ken Stone Index, Aug. 13, 2001, pp. 1-11, Ken Stone.

* cited by examiner

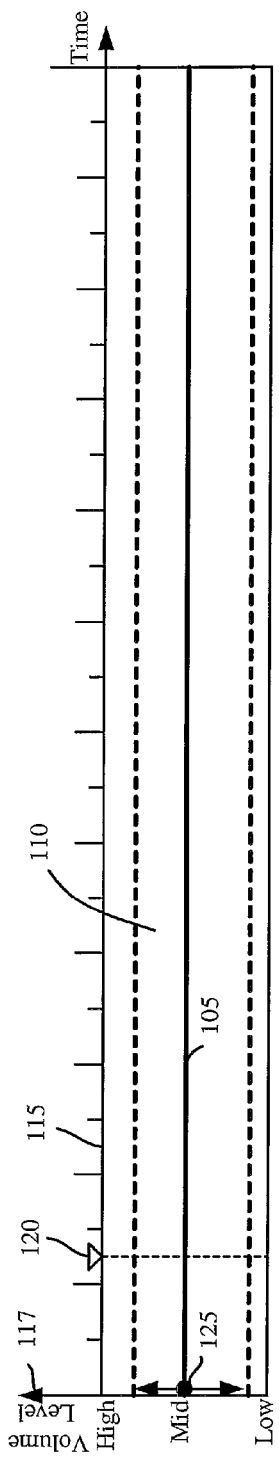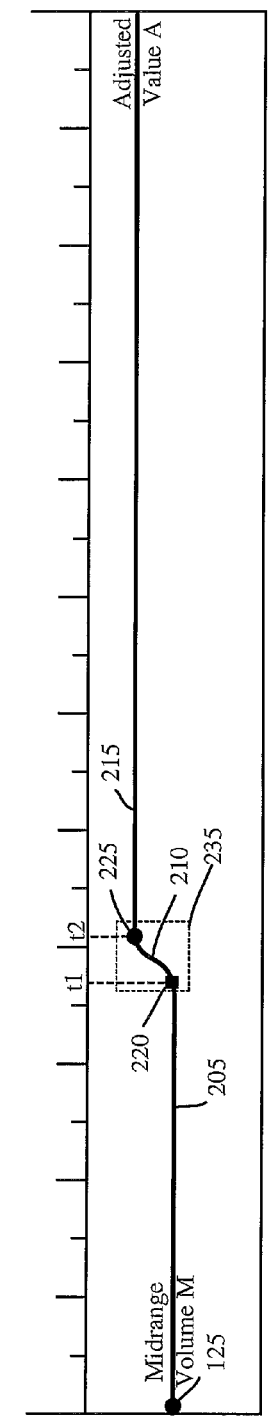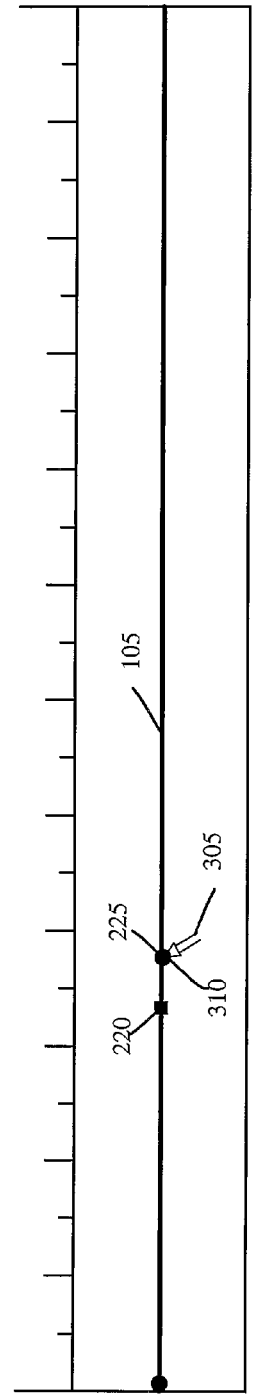

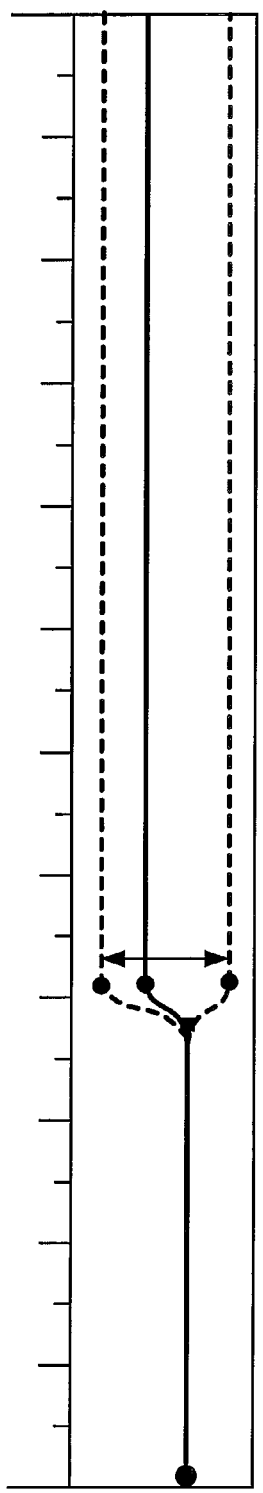
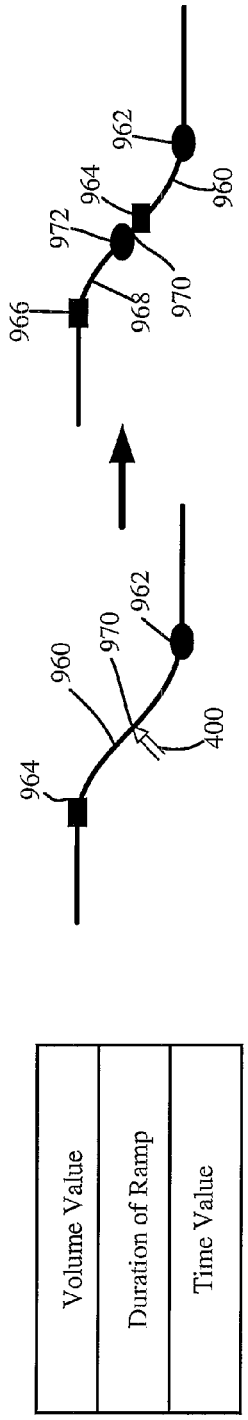
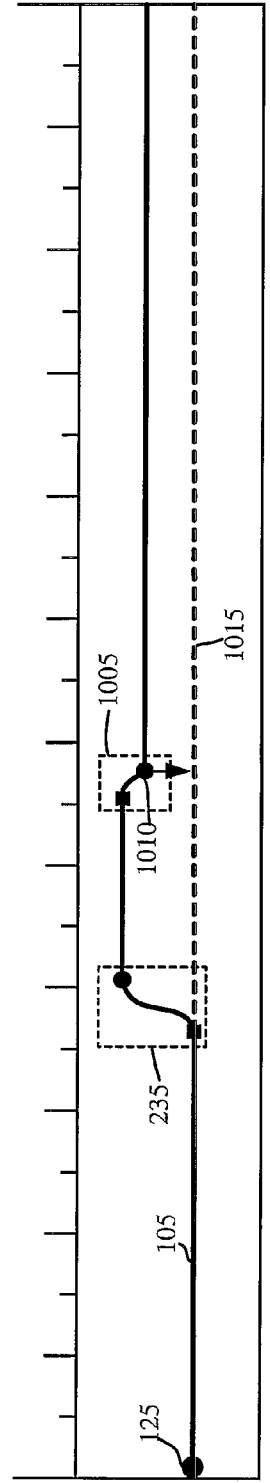
*Figure 7*
*Figure 9B*
*Figure 8*
*Figure 10*

METHOD AND APPARATUS FOR CONTROLLING VOLUME

CLAIM OF BENEFIT TO RELATED APPLICATION

This application is a continuation application of U.S. Non-provisional patent application Ser. No. 10/337,925, now issued as U.S. Pat. No. 7,319,764, filed Jan. 6, 2003, entitled "Method and Apparatus for Controlling Volume." U.S. Non-provisional patent application Ser. No. 10/337,925, now issued as U.S. Pat No. 7,319,764 is incorporated herein by reference.

FIELD OF THE INVENTION

The invention is directed towards method and apparatus for controlling volume.

BACKGROUND OF THE INVENTION

Controlling volume is often an important aspect of creating multimedia content. This is especially the case when several tracks of audio are mixed to create the content. Controlling the volume of several audio tracks, however, often requires expensive equipment. Less expensive equipment often does not provide sufficient control over the volume level. In addition, the prior art does not provide a visual and intuitive technique for controlling volume. Therefore, there is a need for a simple method that controls the volume of an audio track in a visual and intuitive manner.

SUMMARY OF THE INVENTION

Some embodiments of the invention provide a method for controlling the volume of an audio track. This method represents the volume of an audio track with a graph. This graph is defined along two axes, with one axis representing time and the other representing the volume level. A user can adjust the graph at different instances in time in order to change the volume level in the audio track at these instances. Different embodiments use different types of graphs to represent volume. For instance, some embodiments use a deformable line bar.

BRIEF DESCRIPTION OF THE DRAWINGS

The novel features of the invention are set forth in the appended claims. However, for purpose of explanation, several embodiments of the invention are set forth in the following figures.

FIG. 1 illustrates a deformable line bar of some embodiments of the invention.

FIG. 2 illustrates a deformation of the volume-control bar of FIG. 1.

FIGS. 3 and 4 illustrate a click-and-drag operation that results in the deformation illustrated in FIG. 2.

FIG. 7 illustrates an example of moving the volume-control bar up or down along a volume-level axis in order to change the volume-level specified by a deformity in the volume-control bar.

FIG. 8 illustrates the attributes of a volume marker in some embodiments.

FIG. 9B illustrates an example of performing a click-and-drag operation on a portion of a previously defined deformity along the volume-control bar.

FIG. 10 illustrates an example of drawing a dashed line to assist in the vertical movement of a volume-control knob.

DETAILED DESCRIPTION OF THE INVENTION

Figure 4:
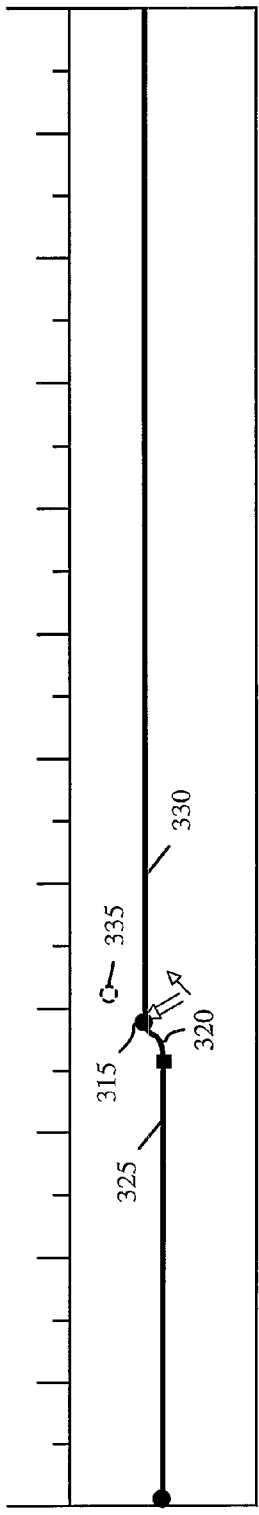

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for controlling the volume of an audio track. The audio track can be a standalone track, or it can be associated with, or a part of, a visual presentation (such as a slide show, a movie, an animation, etc.). This method represents the volume of an audio track with a graph. This graph is defined along two axes, with one axis representing time and the other representing the volume level. A user can adjust the graph at different instances in time in order to change the volume level in the audio track at these instances.

Different embodiments use different types of graphs to represent volume. For instance, the embodiments described below use a deformable line bar. Specifically, FIG. 1 illustrates a deformable line bar 105 that is superimposed on a rectangular box 110. This box is a graphical representation of the audio track. In some embodiments, the line bar 105 and the rectangular box are part of a graphical user interface ("GUI") with which the user can interact through traditional GUI operations, such as click operations (e.g., to select an item), click-and-drag operations (e.g., to move an item), etc.

Above the rectangular box are a timeline 115 and a time marker 120. When the audio track is playing, the time marker 120 moves along the timeline 115 to specify the portion of the track that is playing at each instance in time. A user can also drag the time marker 120 to a particular time on the timeline 115 to listen to the audio track starting at that time.

In FIG. 1, the volume-control bar 105 is defined by reference to two axes. One axis is the above-described horizontal timeline 115, while the other is a vertical volume axis 117. Different embodiments express different volume indicia along the volume axis. For instance, in some embodiments, this volume axis expresses the volume levels in terms of percentages that are to be multiplied with a base volume value. The volume-axis value of the volume-control bar 105 at any instance in time (i.e., at any point along the time axis) represents the volume level of the audio track at that instance.

Initially, this bar is flat about a midrange volume value M. In other words, the initial volume along the entire track is equal to the midrange volume value M.

Through the volume-control bar 105, the user can easily change the volume level. For instance, this bar has a volume-control knob 125 at its beginning. The user can drag this knob vertically up or down to increase or reduce the volume level of the audio track. This is illustrated in FIG. 1. In some embodiments, this knob is not visible or is only visible once the user clicks on the start of the bar.

The user can also change the volume level at any point in time by deforming the bar at that point in time. For instance, FIG. 2 illustrates the deformation of the volume-control bar 105 starting at a time t1. As a result of this deformation, the volume-control bar 105 has three different portions. These are (1) a flat portion 205 representing the audio track's volume before the time t1, (2) a ramping portion 210 representing the track's volume between times t1 and t2, and (3) a flat portion 215 representing the track's volume after time t2. The flat portion 205 signifies that the audio track's volume before the time t1 is constant and equal to the midrange value M. The ramping portion 210 signifies that the track's volume changes from the midrange value M to an adjusted value A between the time t1 and a time t2. The flat portion 215 signifies that the audio track's volume after the time t2 is constant and equal to the adjusted value A. Two control knobs 220 and 225 specify the beginning and end of the ramping portion 210. These control knobs are further described below. Also, some embodiments specify the ramp as a smooth spline curve, instead of specifying it as a straight line.

The user can deform the bar through a simple click-and-drag operation. Specifically, to modify the bar, the user can (1) move the cursor to a portion of the bar that is not within a specified distance of a control knob, (2) perform a click-and-hold operation (e.g., press a mouse button down and hold it in a depressed state), (3) drag the cursor to a new location within the box 110, and (4) terminate the click operation (e.g., release the mouse button).

FIGS. 3 and 4 illustrate the click-and-drag operation that results in the modification illustrated in FIG. 2. FIG. 3 shows that a cursor 305 is initially positioned at a location 310 on the bar 105. As shown in FIG. 3, the moment that the user starts to perform the click-and-drag operation at location 310, the two control knobs 225 and 220 are defined on the volume bar. The knob 225 is initially defined at the location of the click, while the knob 220 is a time interval (e.g., 0.5 seconds) behind the other knob. These knobs are further described below.

FIG. 4 shows the cursor 305 after it has been dragged to a new position 315. As shown in this figure, this dragging specifies a ramp 320 that divides a previously undivided portion of the bar (which in this case is the entire bar) into two portions 325 and 330 that are at different volume levels. Once the user drags the cursor to the position 335, the user terminates the click-and-drag operation (e.g., releases the mouse button). At this point, the modification illustrated in FIG. 2 is specified. Some embodiments automatically set the duration of a ramp to a particular value (e.g., 0.5 seconds) in most instances when a portion of the volume bar is deformed and a ramp is defined. This duration, however, can be modified, as further described below.

As shown in FIG. 2, the click-and-drag operation creates two knobs 220 and 225 that respectively specify the beginning and end of ramp 210 (i.e., specify the beginning and end of the deformation). The knob 220 is square and specifies the beginning of the ramp, while the knob 225 is round and specifies the end of the ramp. In the embodiments described below, the square knob is always to the left of the round knob. As shown in FIG. 3, the round knob coincides with the location of the cursor during the click-and-drag operation, while the square knob typically remains a particular time interval behind the round knob.

During the entire click-and-drag operation, the volume level of the square knob remains the initial volume level of the bar at the position that the user clicked when he initiated the click-and-drag operation. In other words, the volume-axis value of the square knob 220 is the volume level of the audio track before it was changed. On the other hand, the volume-axis value of the round knob 225 specifies a new volume level for the audio track. The audio track will be at this new volume level unless the bar is modified again.

The knobs 220 and 225 are selectable data points that can be used to modify attributes of the ramp 210. All control knobs (such as knobs 125, 220, and 225) of the volume bar can be dragged through click-and-drag operations. Specifically, to drag any control knob, the user can place the cursor over the knob, perform a click-and-hold operation to select the knob, drag the knob to the desired location, and then terminate the click operation.

Figure 5:
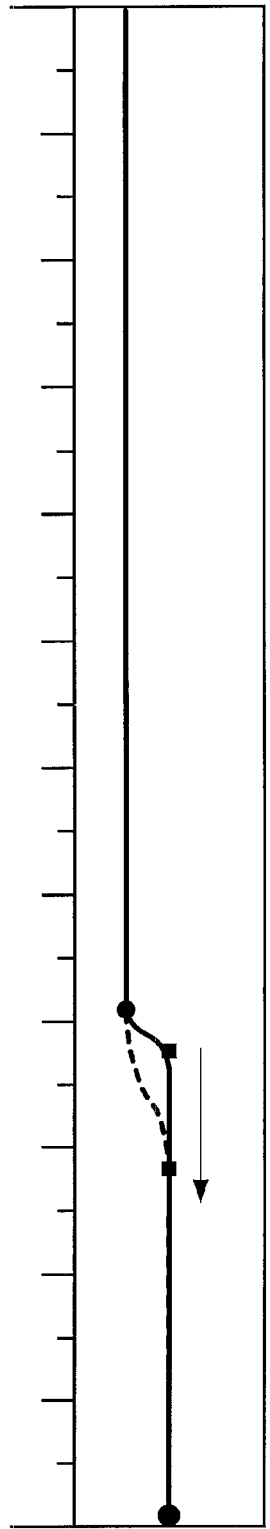
FIG. 5 illustrates an example where the user drags a duration-control knob associated with a deformity in the volume-control bar.

A user can increase or decrease the duration of the ramp by dragging the square knob 220 away or towards the round knob 225. Accordingly, the square knob will be referred to below as the duration-control knob. FIG. 5 illustrates an example of the operation of the square knob. In this example, the user drags the knob 220 in a direction away from the knob 225 to increase the duration of the ramp 210. A duration-control knob can also be moved towards the round knob, in order to reduce the duration of the ramp. The duration-control knob, however, cannot pass the round knob.

Figure 6:
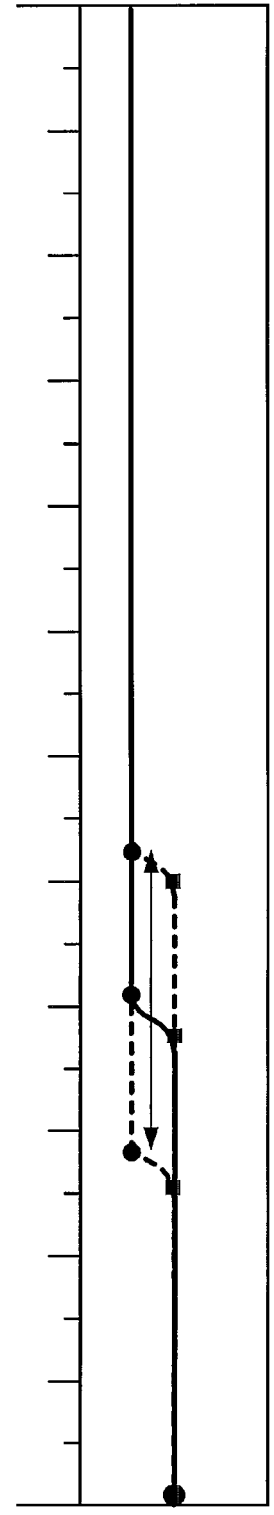
FIG. 6 illustrates an example of moving a deformity in the volume-control bar left or right along the timeline by dragging a volume-control knob associated with this deformity.

The round knob 225 can be used to change the ramp's location or to change the new-volume level specified by the ramp. Accordingly, the round knob is referred to below as the volume-control knob. FIG. 6 illustrates an example of the operation of the volume-control knob. This figure illustrates that the ramp 210 can be moved left or right along the timeline by dragging the round knob 225 horizontally right or left along the timeline. FIG. 7 illustrates that dragging the round knob 225 vertically up or down changes the volume-level specified by the ramp.

In the embodiments described below, the duration-control knob of one ramp cannot move the volume-control knob of another ramp. However, the volume-control knob of one ramp can move the duration-control knob of another ramp. In fact, one ramp's volume-control knob can push another ramp's duration-control knob so much that the two ramp's volume-control knobs overlap. When two volume-control knobs overlap, the ramp that possesses the duration-control knob that is being pushed (i.e., the ramp that does not contain the volume-control knob that is doing the pushing) is deleted. A user can also delete a ramp by selecting it and pressing the delete key.

Some embodiments use one or more volume markers to specify the volume levels along the volume-control bar. These embodiments define an initial volume marker that specifies the volume level at the start of the volume-control bar. For each modification along the volume-control bar, these embodiments also define a volume marker to represent the change in the volume level due to the modification. For instance, in FIG. 2, two volume markers are defined, an initial volume marker for the initial volume-control knob 125, and another volume marker for the modification 235 specified by the duration-control knob 220, ramp 210, and volume-control knob 225. Each volume marker is associated with a volume-control knob.

FIG. 8 illustrates the attributes of a volume marker in some embodiments. These attributes include a time value, a volume value, and a ramp duration. The time value and the volume value are respectively the time-axis value and the volume-axis value of the volume-control knob that is associated with the volume marker. For example, in the example illustrated in FIG. 2, the time-axis value t2 and the volume-axis value A are the time- and volume-values associated with the volume-control knob 225 for this modification. Hence, the time and volume values t2 and A are stored for the volume marker of the modification 235. Similarly, in this example, the time-axis value 0 and the volume-axis value M of the knob 125 are the time and volume values of the volume-control knob 125 that is associated with the bar's initial volume marker.

The initial volume marker, which is specified at the start of the volume-control bar, does not have an associated ramp, since it is not defined for a volume-bar modification. Hence, its ramp duration is null. On the other hand, each volume marker that is specified for a volume-bar modification has an associated ramp, and the duration of this ramp is stored as an attribute of the volume marker. This duration is the difference between the time-axis values of the duration-control and volume control knobs of the volume bar modification. For instance, the ramp duration of a volume marker specified for the modification 235 in FIG. 2 is the difference in the time-axis values (i.e., (t2-t1)) of the knobs 225 and 220.

Figure 9A:
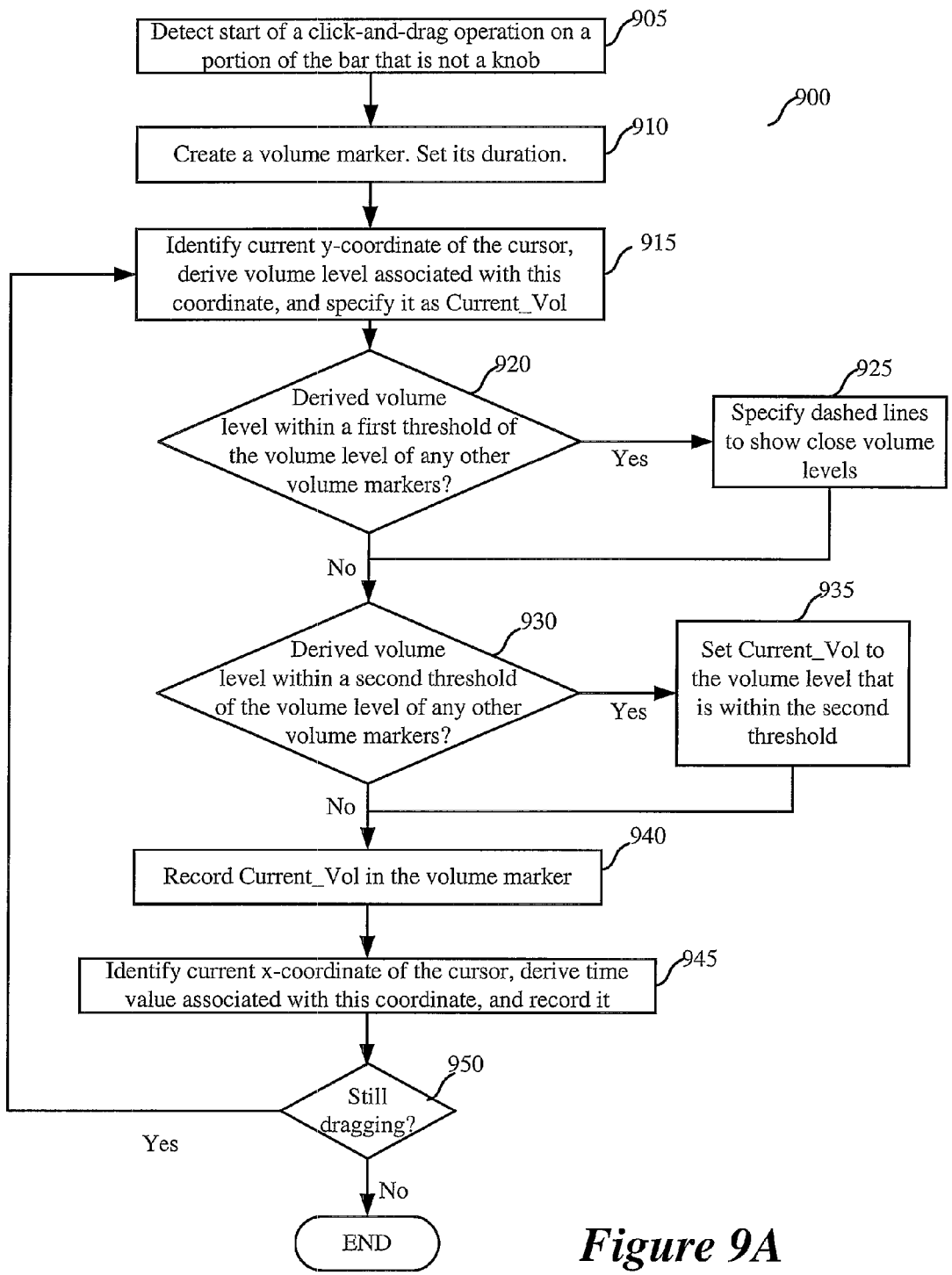
FIG. 9A illustrates a process that creates a volume marker.

FIG. 9A illustrates a process 900 that creates a volume marker. This process starts (at 905) when it detects that a user has started a click-and-drag operation on a portion of the volume-control bar that is not within a specified distance of a control knob. The process then creates (at 910) a volume marker for the modification to the volume bar that the user has started to make.

If the click-and-drag operation is performed on a portion of a previously defined ramp, the process also modifies (at 910) the duration attribute of the volume marker of the previously defined ramp. For instance, FIG. 9B illustrates one such operation that starts at a location 970 of a ramp 960 of a previously defined volume modification. A volume-control knob 962 and a duration-control knob 964 define the ramp 960. Once the user starts his click-and-drag operation, the ramp 960 is modified. Specifically, the location of its duration-control knob 964 is given to a duration-control knob 966 of a new ramp 968 that is defined in response to the click-and-drag operation. For the new ramp 968, a volume-control knob 972 is defined to the left of the start location 970 of the click-and-drag operation, as shown in FIG. 9B. The duration-control knob 964 of the ramp 960 moves to the light of the start location 970. Hence, when the click-and-drag operation is performed on the previously defined ramp 960, the process modifies the duration attribute of the volume marker of the ramp 960 to reflect the movement of this ramp's duration-control knob 964. In the example illustrated in FIG. 9B, if the user starts to drag the cursor to the fight of the location 970, the volume-control knob 972 starts to modify immediately the ramp 960. The handling of such a modification will be described further below.

At 910, the process also sets the duration of the volume marker that it created at 910. In most situations, the process typically sets this value to 0.5 seconds. The process might set this value to less than 0.5 seconds when the volume marker is close to the temporal boundary of the audio track, or when the volume marker is defined in a middle of a previously defined ramp that is relatively short.

After 910, the process identifies (at 915) the current y-coordinate of the cursor. At 915, the process maps this coordinate to a volume level Current_Vol along the volume axis 117.

Next, the process determines (at 920) whether the volume level Current_Vol is within a first threshold of a volume level of any other volume marker of the volume bar 105. If not, the process transitions to 930, which is further described below. Otherwise, to show each volume level that is within the first threshold of the volume level Current_Vol, the process specifies (at 925) a dashed line for the graphics system to draw. FIG. 10 illustrates an example of drawing such a dashed line. In this example, the user is specifying another modification 1005 after a first modification 235 on the volume bar 105. The modification 1005 is specified by a volume control knob 1010, which follows the cursor's movement. Accordingly, when the cursor's gets close to the volume level prior to the modification 235 (i.e., when the volume level of the knob 1010 is within a first threshold of the volume level of the initial volume control knob 125), the process 900 specifies a dashed line 1015, which the graphics system draws to specify the volume level of the initial volume control knob 125.

After 925, the process transitions to 930. At 930, the process determines whether the volume level Current_Vol is within a second threshold of the volume level of any other volume marker of the volume bar. The second threshold is typically smaller than the first threshold. When the volume level Current_Vol is not within the second threshold of any other volume level, the process transitions to 940.

Otherwise, if the process identifies (at 930) a volume level that is within a threshold of Current_Vol, the process sets (at 935) the volume level Current_Vol to the identified volume level. For instance, in the example illustrated in FIG. 10, the process will define the volume level Current_Vol to be the volume level 1015, when the control knob 1010 gets within a second threshold of the volume level 1015. In some embodiments, the process also causes (at 935) the cursor to snap to the volume level identified at 930. Some embodiments snap to, and/or specify dashed lines for, only volume levels of volume markers that are before the current volume marker.

After 935, the process transitions to 940. At 940, the process records the volume level Current_Vol as the volume-level attribute of the volume marker. At 945, the process then identifies the current x-coordinate of the cursor, maps this x-coordinate to a time value along the timeline 115, and then records this time value as the time-value attribute of the volume marker. As mentioned before, this time value is the time value of the volume-control knob of the volume marker.

After 945, the process determines (950) whether the click-and-drag operation is still continuing. If so, the process returns to 915 to repeat its operations and update the volume marker attributes. Each time the process reaches 950, it has updated the volume marker's volume and time attributes. Hence, each time the process reaches 950, the graphics system can redraw the volume marker, the volume bar, and/or the other attributes of this bar to provide an up to date representation of the volume marker and volume bar on the display. The process terminates when it determines (at 950) that the click-and-drag operation has terminated.

Figure 11:
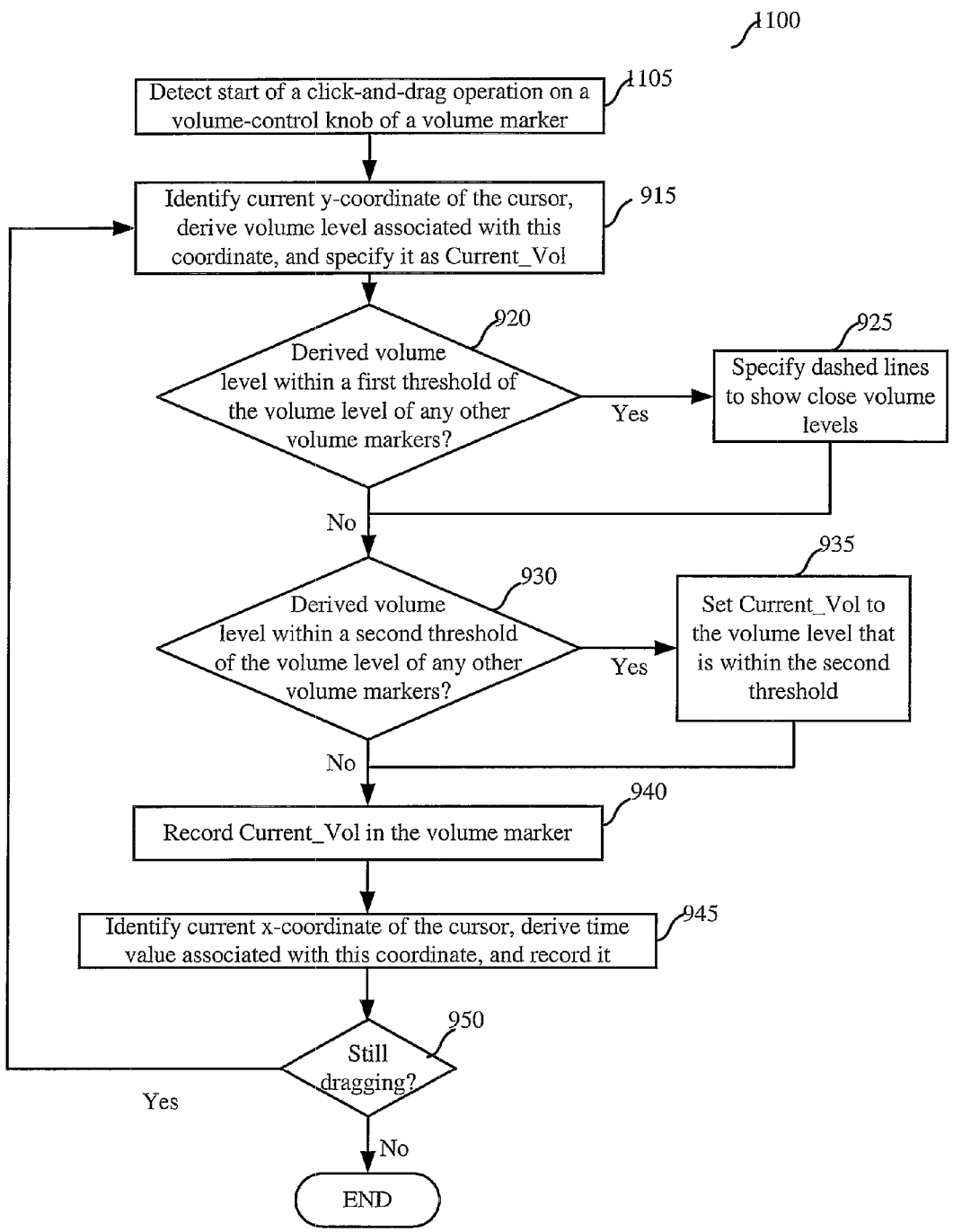
FIG. 11 illustrates a process for modifying a volume marker by performing a click-and-drag operation on the marker's volume-control knob.

FIG. 11 illustrates a process 1100 for modifying a volume marker by performing a click-and-drag operation on the marker's volume-control knob (such as knob 225 for the volume marker 235 in FIG. 2). In some embodiments, this process 1100 starts when the user clicks within a certain distance of the volume-control knob and drags this knob by a slight amount. In other words, this click-and-drag operation starts (at 1105) the process 1100. Once this process starts, its operation is similar to the operations after 910 of the process 900 of FIG. 9A. In other words, the operations 915-950 of the process 1100 are similar to the similarly numbered operations 915-950 of the process 900. These similar operations are not further described below in order not to obscure the description of the invention with unnecessary detail.

Figure 12:
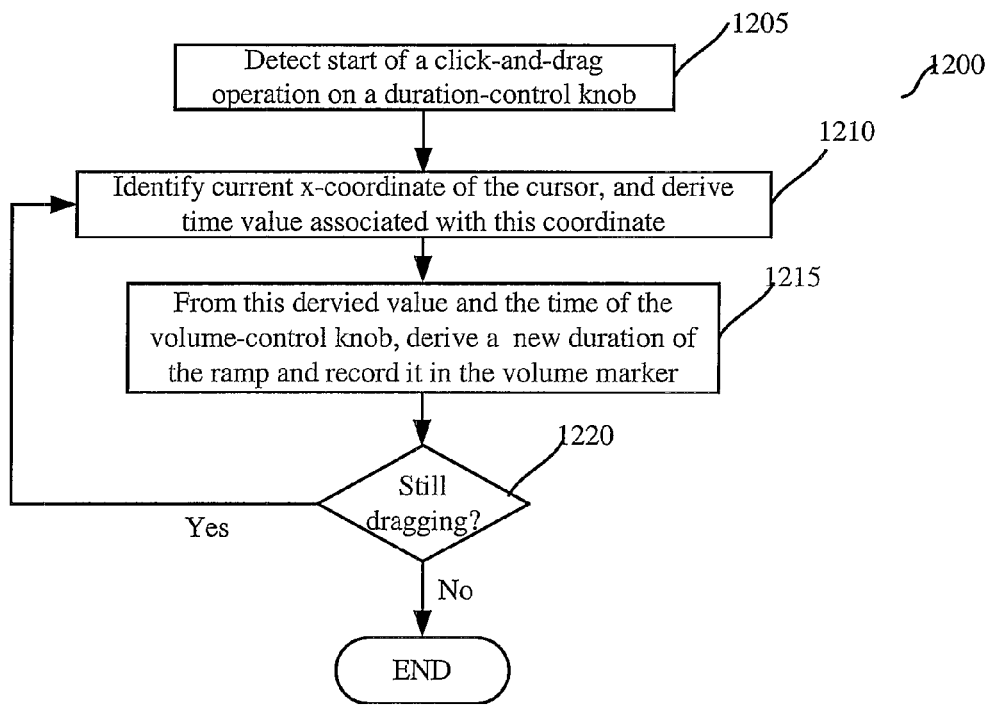
FIG. 12 illustrates a process for modifying a volume marker by performing a click-and-drag operation on the marker's duration-control knob.

FIG. 12 illustrates a process 1200 for modifying a volume marker by performing a click-and-drag operation on the marker's duration-control knob (such as knob 220 for the volume marker 235 in FIG. 2). In some embodiments, this process 1200 starts (at 1205) when the user (1) clicks within a certain distance of the duration-control knob of a volume marker, and (2) drags this knob by a slight amount. Once the process detects this click-and-drag operation, the process identifies (at 1210) the current x-coordinate cursor. It maps (at 1210) this coordinate to a time value along the time axis 115.

Next, at 1215, it computes a new duration for the volume marker's ramp. This new duration equals the difference between the time value attribute of the volume marker (where this attribute corresponds to the time value of the marker's volume-control knob) and the time value identified at 1210. This difference can never be less than zero, as the duration-control knob can never pass the volume-control knob on the timeline. At 1215, the process records the new computed duration in the volume marker.

After 1215, the process determines (at 1220) whether the click-and-drag operation is still continuing. If so, the process returns to 1210 to repeat its operations and again update the volume marker duration attribute. Each time the process reaches 1220, it has updated the volume marker's duration attribute. Hence, each time the process reaches 1220, the graphics system can redraw the volume marker, the volume bar, and/or the other attributes of this bar to provide an up to date representation of the volume marker and the volume bar on the display. The process terminates when it determines (at 1220) that the click-and-drag operation has terminated.

As mentioned above, the duration of a particular volume marker can also be modified if another volume marker's volume-control knob pushes the particular volume marker's duration-control knob towards the particular volume marker's volume-control knob. In this circumstance, some embodiments use a process similar to process 1200, except that the process in this case deletes the volume marker when its ramp duration has reached zero, as at this point the two volume-control knobs of the two volume markers overlap.

Figure 13:
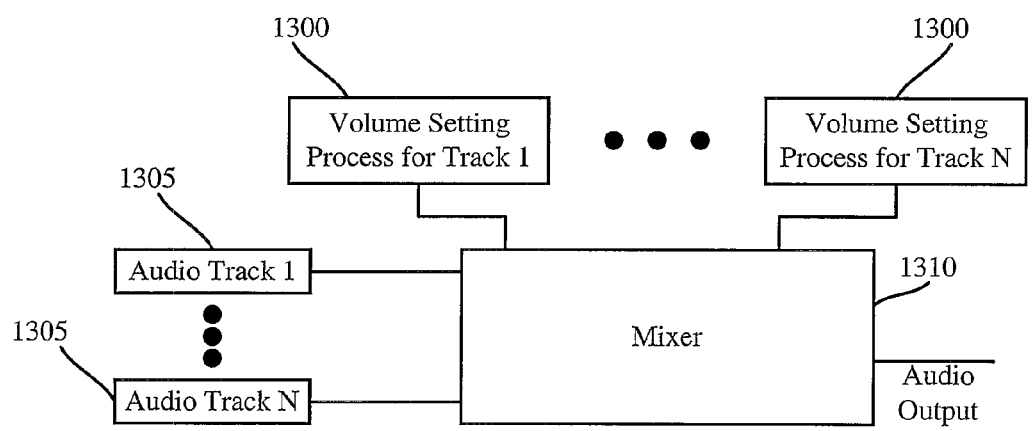
FIGS. 13, 14, and 15 illustrate how some embodiments use the volume markers specified along a volume bar to define the volume level of an audio track.
Figure 14:
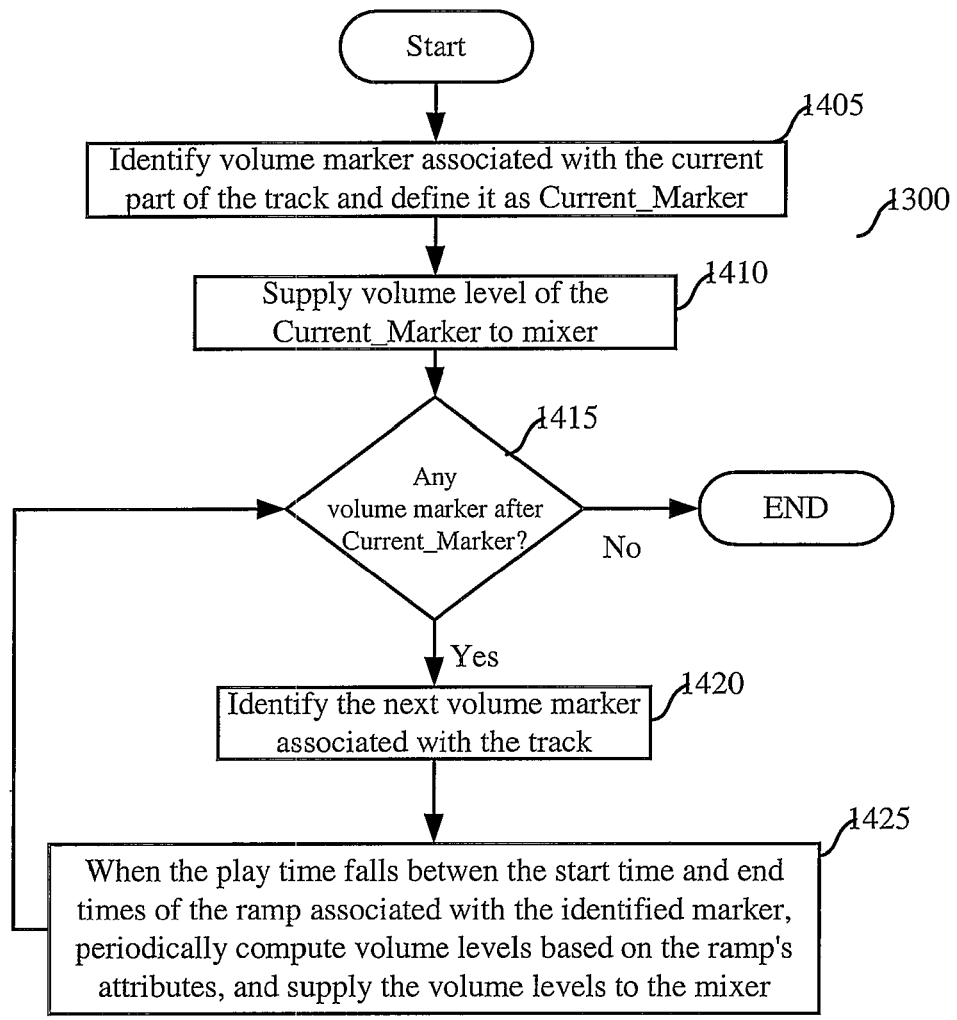

FIGS. 13 and 14 illustrate how some embodiments use the volume markers specified along a volume bar to define the volume level of an audio track. FIG. 13 illustrates a mixer that receives audio tracks 1 to N and produces an output audio based on these tracks. The mixer also receives volume levels for each track from a volume setting process 1300 for the track.

FIG. 14 illustrates one example of a volume setting process 1300. Some embodiments perform this process each time a user directs these embodiments to play an audio track that has set according to the invention. The user might direct the audio track to start playing from its beginning or from some other part of the track. As mentioned above by reference to FIG. 1, a user in some embodiments can drag a timer marker 120 along a timeline 115 to specify where to start playing the audio track.

Figure 15:
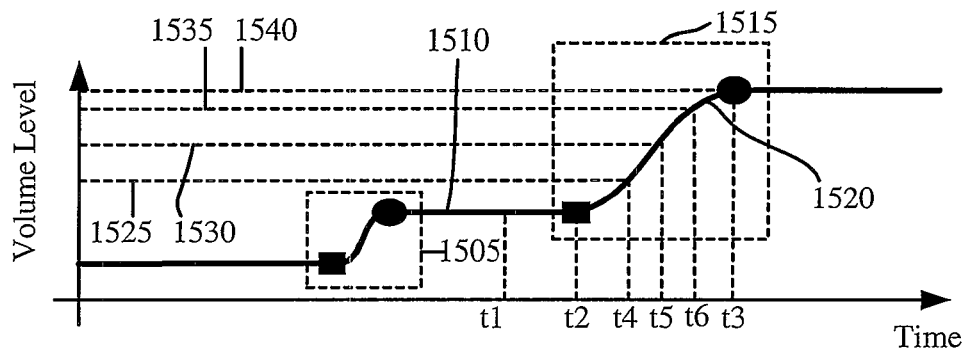

The process 1300 initially identifies (at 1405) the volume marker that sets the volume level for the part of the audio track that starts the current play. When the audio track starts from its beginning, this volume marker is the initial volume marker associated with the initial volume-control knob 125. However, when the audio track starts at some time t within the track, the volume marker identified at 1405 is the volume marker that has a time-value attribute that (1) is before the start time t and (2) is the closest to the start time t. For instance, FIG. 15 illustrates an example of an audio track that starts to play at a time t1. In this example, the process 1300 identifies (at 1405) the volume marker that is associated with the volume modification 1505. This is because this volume modification occurs before the time t1 and is the closest modification to this time. At 1405, the process defines the marker that it identified at 1405 as the Current_Marker.

Next, at 1410, the process supplies to the mixer 1310 the volume level that is specified by the volume marker identified at 1405. In the example illustrated in FIG. 15, this volume level is the level 1510. The process then determines (at 1415) whether there is another volume marker after the Current_Marker on the volume bar. If not, the process terminates. Otherwise, at 1420, the process identifies the volume marker that is after the Current_Marker on the volume bar, and specifies this identified marker as the new Current_Marker. In FIG. 15, the next volume marker is the marker for the modification 1515.

After 1420, the process transitions to 1425, where it stays until the mixer has played the audio track up to the time value specified in the Current_Marker. The time value specified in this marker corresponds to the time that the ramp associated with this marker ends. When the process 1300 is at 1425 and the track's play time falls between the start and end times of the ramp associated with the Current_Marker, the process periodically (at 1425) (1) computes the volume level based on the ramp's attributes, and (2) supplies the computed volume levels to the mixer. As mentioned above, some embodiments specify the ramp as a smooth spline curve. Hence, the values computed at 1425 are value along this curve at different points in time.

FIG. 15 provides an example of the periodic computation at 1425. Specifically, this figure illustrates that while the track's play time falls between the start and end times t2 and t3 of the ramp 1520, the process 1300 computes four volume levels, where each volume level is generated at a different time during the audio's play. The process computes the first level 1525 at time t4, the second level 1530 at time t5, the third level 1535 at time t6, and the fourth level 1540 at time t3.

Once the process 1300 determines (at 1420) that the play time has passed the time value specified in the Current_Marker, it transitions back to 1415. For instance, in FIG. 15, the process transitions back to 1415 after it computes the fourth level 1540 and then determines that the play time has past t3. The operation of the process 1300 from 1415 was described above.

The above-described embodiments have numerous advantages. These embodiments allow a user to set easily different volume levels at different times for the same track. They enable the user to do this in a visual and intuitive manner. This volume control is especially beneficially when mixing several audio tracks, where at different times the volumes of different tracks need to be raised while others need to be lowered.

Figure 16:
FIG. 16 illustrates an example where the invention is useful in mixing two audio tracks.

For instance, this is a useful feature when dubbing commentary over the audio track of a video clip. It is also useful when wishing to reduce the background music associated with a video clip in order to listen to the audio component of the video clip. FIG. 16 illustrates one such example. This figure illustrates the GUI interface of a movie editing application. In this example, a user is utilizing the editing application to work on a video clip that has an audio track associated with it. The volume level of the audio track appears as a line bar 1605 that is superimposed on the rectangular box 1610, which represents the video clip. This line bar is superimposed on this box since the user has checked an edit volume button 1640.

In FIG. 16, the user has added a second audio track to the clip. This added audio track appears as a rectangular box 1615 below the box 1610. A line bar 1620 is superimposed on the box 1615. This line bar represents the volume level of the second audio track. As shown in FIG. 16, the volume level of the video clip's audio component is increased in a time interval 1625, while the volume level of the added audio track is decreased in this interval. This allows the viewer to hear the video clip's audio much more clearly during the timer interval 1625. Another volume feature in FIG. 16 should be noted. This feature is the volume control bar 1630. After selecting an audio track (which can be either the audio component of a visual clip or a separate audio track), the user can drag a marker 1635 along this bar to reduce or increase the overall volume level.

Figure 17:
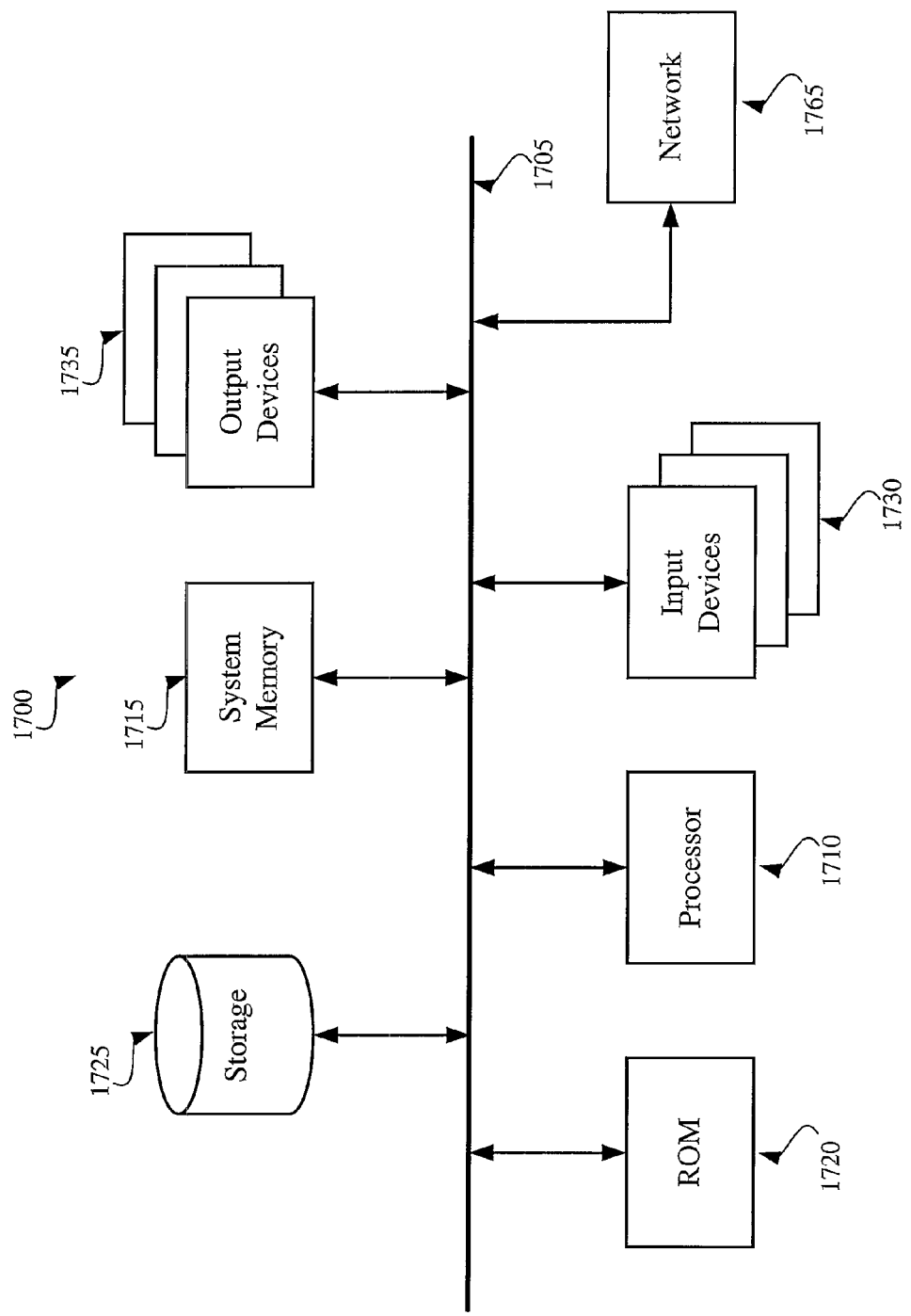
FIG. 17 illustrates a computer system with which one embodiment of the invention is implemented.

FIG. 17 presents a computer system with which one embodiment of the invention is implemented. Computer system 1700 includes a bus 1705, a processor 1710, a system memory 1715, a read-only memory 1720, a permanent storage device 1725, input devices 1730, and output devices 1735.

The bus 1705 collectively represents all system, peripheral, and chipset buses that communicatively connect the numerous internal devices of the computer system 1700. For instance, the bus 1705 communicatively connects the processor 1710 with the read-only memory 1720, the system memory 1715, and the permanent storage device 1725.

From these various memory units, the processor 1710 retrieves instructions to execute and data to process in order to execute the processes of the invention. The read-only-memory (ROM) 1720 stores static data and instructions that are needed by the processor 1710 and other modules of the computer system.

The permanent storage device 1725, on the other hand, is read-and-write memory device. This device is a non-volatile memory unit that stores instruction and data even when the computer system 1700 is off. Some embodiments of the invention use a mass-storage device (such as a magnetic or optical disk and its corresponding disk drive) as the permanent storage device 1725.

Other embodiments use a removable storage device (such as a floppy disk or Zip® disk, and its corresponding disk drive) as the permanent storage device. Like the permanent storage device 1725, the system memory 1715 is a read-and-write memory device. However, unlike storage device 1725, the system memory is a volatile read-and-write memory, such as a random access memory. The system memory stores some of the instructions and data that the processor needs at runtime. In some embodiments, the invention's processes are stored in the system memory 1715, the permanent storage device 1725, and/or the read-only memory 1720.

The bus 1705 also connects to the input and output devices 1730 and 1735. The input devices enable the user to communicate information and select commands to the computer system. The input devices 1730 include alphanumeric keyboards and cursor-controllers. The output devices 1735 display images generated by the computer system. For instance, these devices display IC design layouts. The output devices include printers and display devices, such as cathode ray tubes (CRT) or liquid crystal displays (LCD).

Finally, as shown in FIG. 17, bus 1705 also couples computer 1700 to a network 1765 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1700 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for controlling a volume of an audio track, the method comprising:
   representing the volume of the audio track with a deformable graph, wherein the graph is defined along two axes, wherein one axis represents time and the other axis represents volume level;
   receiving a modification to the graph, wherein the modification comprises a select and drag operation, and produces three different portions of the graph;
   illustrating the modification on the graph as two points on the graph; and
   based on the illustrated modification, specifying volume levels of the audio track at different instances in time.

2. The method of claim 1, wherein the graph is a deformable line.

3. The method of claim 1, wherein the portion of the graph between the two points is nonlinear.

4. The method of claim 3, wherein the portion of the graph between the two points is a spline curve.

5. The method of claim 1, wherein the two points are separated along the time axis by a predetermined amount.

6. A method for controlling a volume of an audio track, the method comprising:
   representing the volume of the audio track with a deformable graph, wherein the graph is defined along two axes, wherein one axis represents time and the other axis represents volume level;
   receiving a modification to the graph; and
   based on the modification, specifying three different portions of the graph corresponding to at least three different volume levels of the audio track.

7. The method of claim 6, wherein the graph is a deformable line.

8. The method of claim 6, wherein at least one of the three portions of the graph is nonlinear.

9. The method of claim 8, wherein the nonlinear portion is a spline curve.

10. The method of claim 6, wherein at least one of the three portions of the graph remains unchanged.

11. A method for controlling a volume of an audio track, the method comprising:
    defining a graphical user interface (GUI); and
    defining a graph to represent the volume of the audio track as a user interface item in the GUI, the graph for receiving modifications to the volume of the audio track and for representing each modification in terms of a first control for controlling an amount by which the modification changes the volume and a second control for controlling a duration of the modification.

12. The method of claim 11, wherein the first control is also for controlling a time location of the modification.

13. The method of claim 11, wherein the first control is a volume-control knob.

14. The method of claim 11, wherein the second control is a duration-control knob.

15. A non-transitory computer readable medium storing a computer program that when executed by at least one processor controls a volume of an audio track, the computer program comprising sets of instructions for:

representing the volume of the audio track with a deformable graph, wherein the graph is defined along two axes, wherein one axis represents time and the other axis represents volume level;

receiving a select and drag operation to the graph; and specifying, based on the select and drag operation, three different portions of the graph corresponding to at least three different volume levels of the audio track.

16. The non-transitory computer readable medium of claim 15, wherein the graph is a deformable line.

17. The non-transitory computer readable medium of claim 15, wherein at least one of the three portions of the graph is nonlinear.

18. The non-transitory computer readable medium of claim 17, wherein the nonlinear portion is a spline curve.

19. The non-transitory computer readable medium of claim 15, wherein at least one of the three portions of the graph remains unchanged.

20. A non-transitory computer readable medium storing a computer program for execution by at least one processor, the computer program comprising a graphical user interface (GUI), the GUI comprising:

a display area to display an audio track; and a graph to representing a volume of the audio track, the graph for receiving modifications to the volume of the audio track and for representing each modification in terms of a first control for controlling an amount by which the modification changes the volume and a second control for controlling a duration of the modification.

21. The non-transitory computer readable medium of claim 20, wherein the first control is also for controlling a time location of the modification.

22. The non-transitory computer readable medium of claim 20, wherein the first control is a volume-control knob.

23. The non-transitory computer readable medium of claim 20, wherein the second control is a duration-control knob.

24. A non-transitory computer readable medium storing a computer program that when executed by at least one processor controls a volume of an audio track, the computer program comprising sets of instructions for:

representing the volume of the audio track with a deformable graph, wherein the graph is defined along two axes, wherein one axis represents time and the other axis represents volume level;

receiving a modification to the graph, wherein the modification comprises a select and drag operation, and produces three different portions of the graph;

illustrating the modification on the graph as two points on the graph; and specifying volume levels of the audio track at different instances in time based on the illustrated modification.

25. The non-transitory computer readable medium of claim 24, wherein the portion of the graph between the two points is nonlinear.

26. The non-transitory computer readable medium of claim 25, wherein the portion of the graph between the two points is a spline curve.

* * * * *